H. HESS.
CAGE FOR ANTIFRICTION BEARINGS.
APPLICATION FILED DEC. 12, 1911.
1,199,182.
Patented Sept. 26, 1916.
2 SHEETS—SHEET 1.
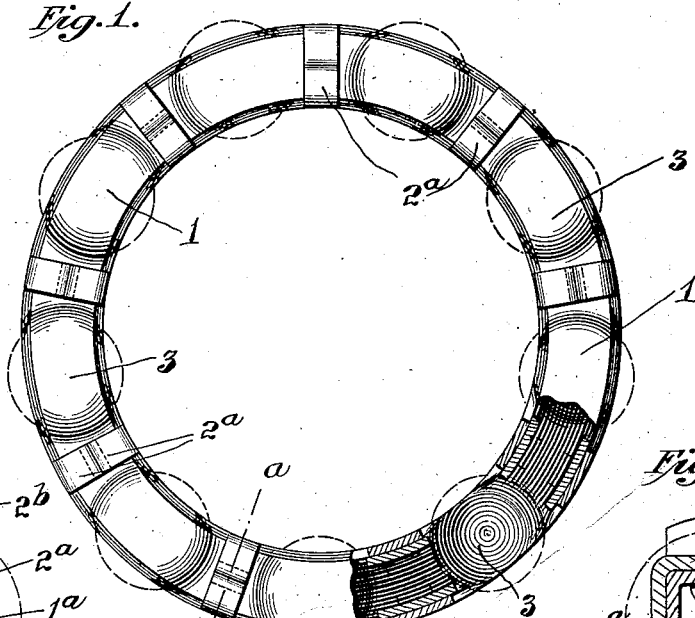
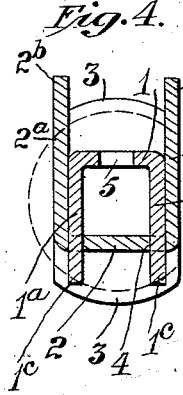
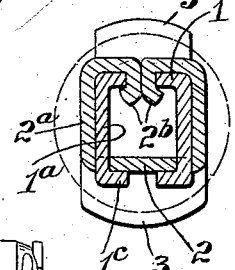
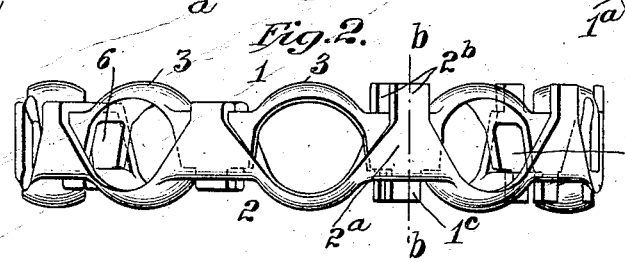
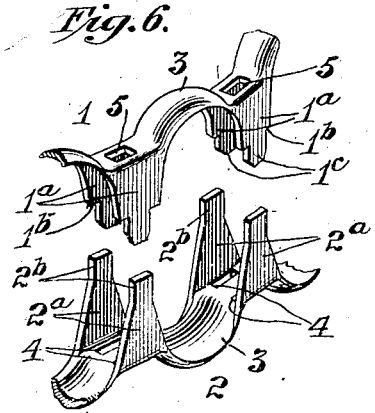
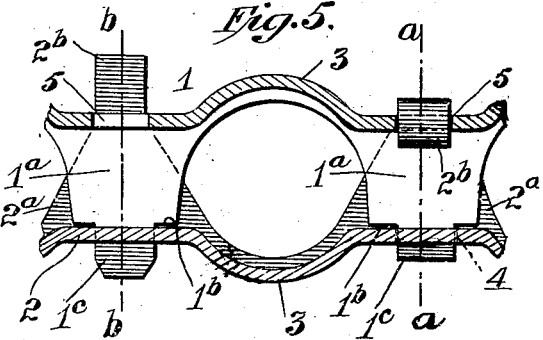
Inventor
Henry Hess H. HESS.
CAGE FOR ANTIFRICTION BEARINGS.
APPLICATION FILED DEC. 12, 1911.
1,199,182.
Patented Sept. 26, 1916.
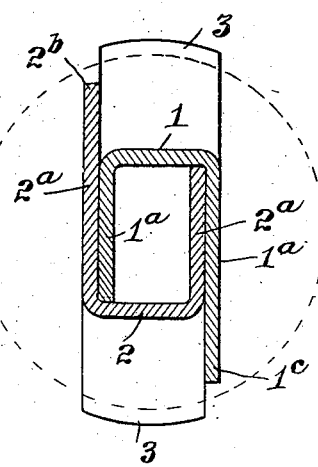
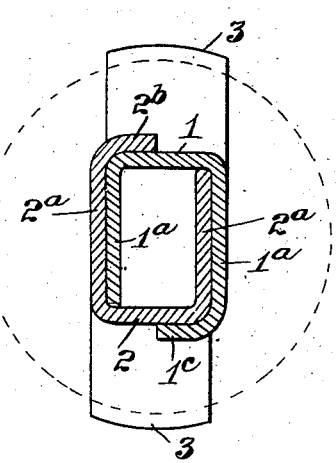
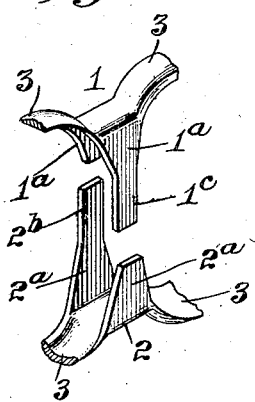

UNITED STATES PATENT OFFICE.

HENRY HESS, OF PHILADELPHIA, PENNSYLVANIA, ASSIGNOR TO THE HESS-BRIGHT MANUFACTURING COMPANY, A CORPORATION OF DELAWARE.

CAGE FOR ANTIFRICTION-BEARINGS.

1,199,182.  Specification of Letters Patent.  Patented Sept. 26, 1916.

Application filed December 12, 1911. Serial No. 665,348.

*To all whom it may concern:*

Be it known that I, HENRY HESS, a citizen of the United States, residing at Philadelphia, in the county of Philadelphia and State of Pennsylvania, have invented certain new and useful Improvements in Cages for Antifriction-Bearings, of which the following is a specification, reference being had therein to the accompanying drawing.

This invention relates to cages for spacing the rolling elements of antifriction bearings, and is designed more particularly for, though not necessarily limited to, use in connection with annular ball bearings.

The objects of the invention are to produce a structure of this character from light material, which will possess the necessary degree of stiffness and strength both circumferentially and laterally, so as to maintain the balls properly and uniformly spaced; which will afford a very considerable surface of contact with the balls; will secure a uniform balancing of the balls in the planes through the centers of the balls at right angles to the axis of the bearing, and which will be capable of convenient and easy assemblage in operative relation to the balls.

A further object of the invention is to provide for the holding of the supply of lubricant for the balls.

With these ends in view my improved cage comprises as its essential features, two rings or plates formed with opposing seats for the rolling elements, and provided with inwardly extending portions between the seats, the said inwardly extending portions of one ring overlapping those of the other ring, so as to form spacing means between the rolling elements.

The invention consists also in forming the said inwardly extending portions of the rings and disposing them relative to each other, so that chambers will be formed between the rolling elements adapted to hold a suitable lubricant.

In the accompanying drawings I have shown cages embodying my invention in two different forms, the rings composing the cage being constructed from thin sheet metal, and being provided with opposing sockets shaped to hold the balls of an annular antifriction bearing, but it will be understood that the cage may be constructed of other materials, and the sockets formed to hold rolling elements of other forms, and adapted for use in connection with thrust bearings, the changes necessary to bring about such alternative constructions and uses being contemplated within the scope and spirit of my invention. It will be understood, therefore, that the invention is not limited to any particular form or construction of the parts except in so far as such limitations are specified in the claims.

In the accompanying drawings: Figure 1 is a plan view of my improved cage in one form, a portion of the same being broken away and the position of the balls being indicated by dotted lines. Fig. 2 is a side elevation of the same, a portion of the cage being shown as it appears before the two rings are finally locked or connected together. Fig. 3 is a cross section on the line $a$—$a$ of Figs. 1 and 5. Fig. 4 is a cross section on the line $b$—$b$ of Figs. 2 and 5. Fig. 5 is a longitudinal sectional elevation of a portion of the cage showing the two rings partially fastened together on one side of a ball seat, and showing the rings fully fastened together on the opposite side of the seat. Fig. 6 is a perspective view of portions of the opposing rings as they appear before they are assembled in operative relation to the balls. Fig. 7 is a cross section of a cage in modified form, showing the rings as they appear before being fastened or locked together. Fig. 8 is a similar view showing the rings fully locked together. Fig. 9 is a perspective view of portions of the rings of the cage as they appear before being assembled in operative relation to the balls.

Referring particularly to Figs. 1 to 6, my improved cage comprises two members or rings 1 and 2, preferably formed of thin sheet metal, which rings are provided at intervals with outwardly bent portions or sockets 3, curved both laterally and circumferentially to conform to the contour of and embrace the balls in two directions, these sockets in the two rings when opposed to each other with the rings assembled in operative relations, constituting ball retaining seats which embrace the balls at diametrically opposite points coincident with the axis of rotation of the balls. Between the sockets the plate 1 is provided with pairs of inwardly extending portions or fingers $1^a$, extending at right angles to the outer face of the ring with the fingers of each pair parallel to each other, the extremities of said fingers being shouldered, as at 1ᵇ, and formed with lips 1ᶜ, the purpose of which will presently appear. The other ring 2 is similarly formed between the sockets therein, with pairs of inwardly extending portions or fingers 2ᵃ, extending at right angles to the outer edge of the ring, with the fingers of each pair parallel to each other, and they have their extremities provided with lips 2ᵇ, the fingers 2ᵃ of each pair being spaced apart a distance sufficient to admit between them the pairs of fingers 1ᵃ of the opposing ring, as shown in Figs. 4 and 6. This construction and arrangement permits the fingers of the two rings to be telescoped one within the other, in assembling the rings in operative relations to confine the balls, the lips 1ᶜ on ring 1 being passed through openings 4—4 in the body of ring 2, and bent down thereon; and the lips 2ᵇ of ring 2 being bent inwardly toward each other on the body of ring 1 and entered in holes 5 in the edge of said ring, and bent inwardly, the bent lips thus serving to lock the two rings firmly together, as shown in Figs. 1, 2 and 3. In assembling the rings in this manner and securing them together, in the case of an annular ball bearing, the two rings are inserted from opposite sides, into the space between the casing members and the bearing, and the opposing pairs of fingers telescoped into each other between the balls, thus spacing the balls and seating them in the several ball seats. The rings being pushed together as far as they will go, which is determined by the engagement of the shoulders 1ᵇ with the inner face of ring 2, the lips of the two rings are bent down as before described, and will effectively and firmly lock the rings together, the inwardly extending fingers of the two rings overlapping each other and being disposed flatly side by side. The edges of the several fingers are so formed and related to each other that when the fingers are thus disposed side by side in the operative relations of the rings, these edges will be presented to contact with the balls and will offer a bearing and guiding surface to the same in a direction circumferentially of the cage, the said guiding surfaces being made up of two thicknesses of metal at opposite sides of the balls.

The overlapping fingers on the two rings are of such width, in a circumferential direction, that they will form chambers or spaces 6, between the balls, as shown in Fig. 2, which chambers may be supplied with a suitable lubricant so as to insure the proper lubrication of the balls.

A cage formed in the manner described may be constructed of very thin and light sheet metal, yet will possess an unusual degree of strength and stiffness both circumferentially and in a lateral direction. The balls are given broad and extended surface contact both in the region of their axis of rotation, and in a circumferential direction, with the result that they will be evenly and uniformly guided in their rotative movements, and will be evenly and effectively balanced in planes through the centers of the balls at right angles to the axis of rotation. Further, the form and construction of the cage enables the rings to be conveniently and easily assembled on the balls; and the manner of securing the rings together in locked relations, effectually prevents their separation or displacement by the strains and forces encountered in the practical operation of the bearings under high speeds.

In Figs. 7 to 9 I have illustrated a modified form of the cage. In this case the two rings or members composing the cage, are generally similar to the form first described, except as to the inwardly extending fingers and the manner of locking the rings together on the balls, the modified construction being more simple, and avoiding the formation of holes or openings in the bodies of the rings. As shown in Fig. 7, the inwardly extending fingers of each pair on the two rings are of different lengths, the shorter fingers on one ring being opposed to the longer fingers on the other ring, and when assembled in operative relation to the balls, the shorter fingers of each ring will extend flatly against the longer fingers of the other ring. In securing the two rings together, the projecting ends of the longer fingers of each ring are bent down inwardly on the outer edge or body portion of the opposing ring, as shown in Fig. 8, and by such interlocking of the rings they are held firmly and fixedly together on the balls. In this form of the cage the two rings are exact counterparts or complements of each other in all respects, and consequently their manufacture is greatly facilitated and economy in production secured.

It will be noted in the applicant's construction that the inwardly extending portions or fingers on the two rings between the ball seats overlap or extend side by side throughout their transverse extent, and that the fingers are of such transverse length that those on one ring may be interlocked with the outer side of the opposite ring. This produces a very strong bracing or reinforcement of the cage against strain acting in a direction radially of the cage, and maintains the same against distortion or displacement of its parts in this direction.

Having thus described my invention, what I claim is:

1. In a cage for antifriction bearings, the combination of two complementary rings disposed face to face and each provided at intervals with sockets, those in one ring facing the sockets in the opposing ring and conjointly constituting ball seats, each of said rings being provided between its sockets with inwardly projecting portions, the projecting portions on one ring lying flatly against and over-lapping the projecting portions on the other ring so as to impart lateral stiffness to the cage as a whole, and presenting a double thickness of metal to the surface of the balls at opposite sides of the same, and the projecting portions on each ring being extended axially beyond the outer end surface of the other ring and being engaged therewith to fixedly connect the rings together in operative relation.

2. In a cage for antifriction bearings, the combination of two rings formed at intervals with opposing outwardly extending portions curved axially and circumferentially and forming ball seats embracing the balls in two directions, the said rings being provided between the ball sockets with flat inwardly extending parallel projections, those on each ring extending flatly in close contact with and overlapping those on the other ring throughout the axial extent of the rings, and said opposing projections conjointly constituting separate and distinct lubricant-holding chambers extending circumferentially and axially between the respective ball seats, and said chambers communicating at their ends with said seats; whereby the adjacent surfaces of adjacent balls are exposed to the lubricant in the intervening chamber.

3. In a cage for antifriction bearings, the combination of two rings formed with opposing seats for the rolling elements, the said rings having openings therethrough, and provided each with inwardly extending fingers adapted to project at their ends through the openings in the other ring.

In testimony whereof I affix my signature in presence of two witnesses.

HENRY HESS.

Witnesses:
  C. S. BUTLER,
  B. KENNEDY.